UNITED STATES PATENT OFFICE.

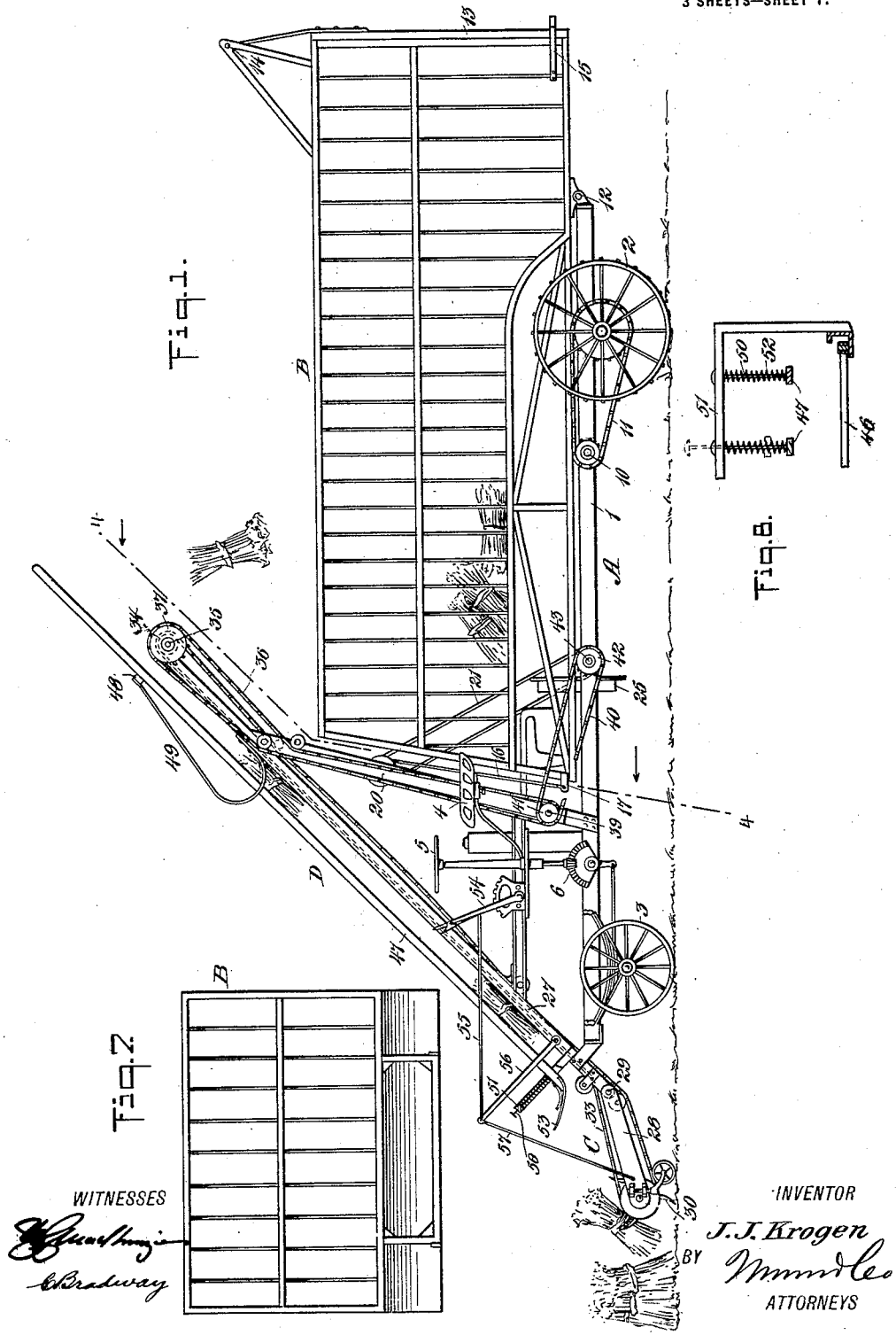

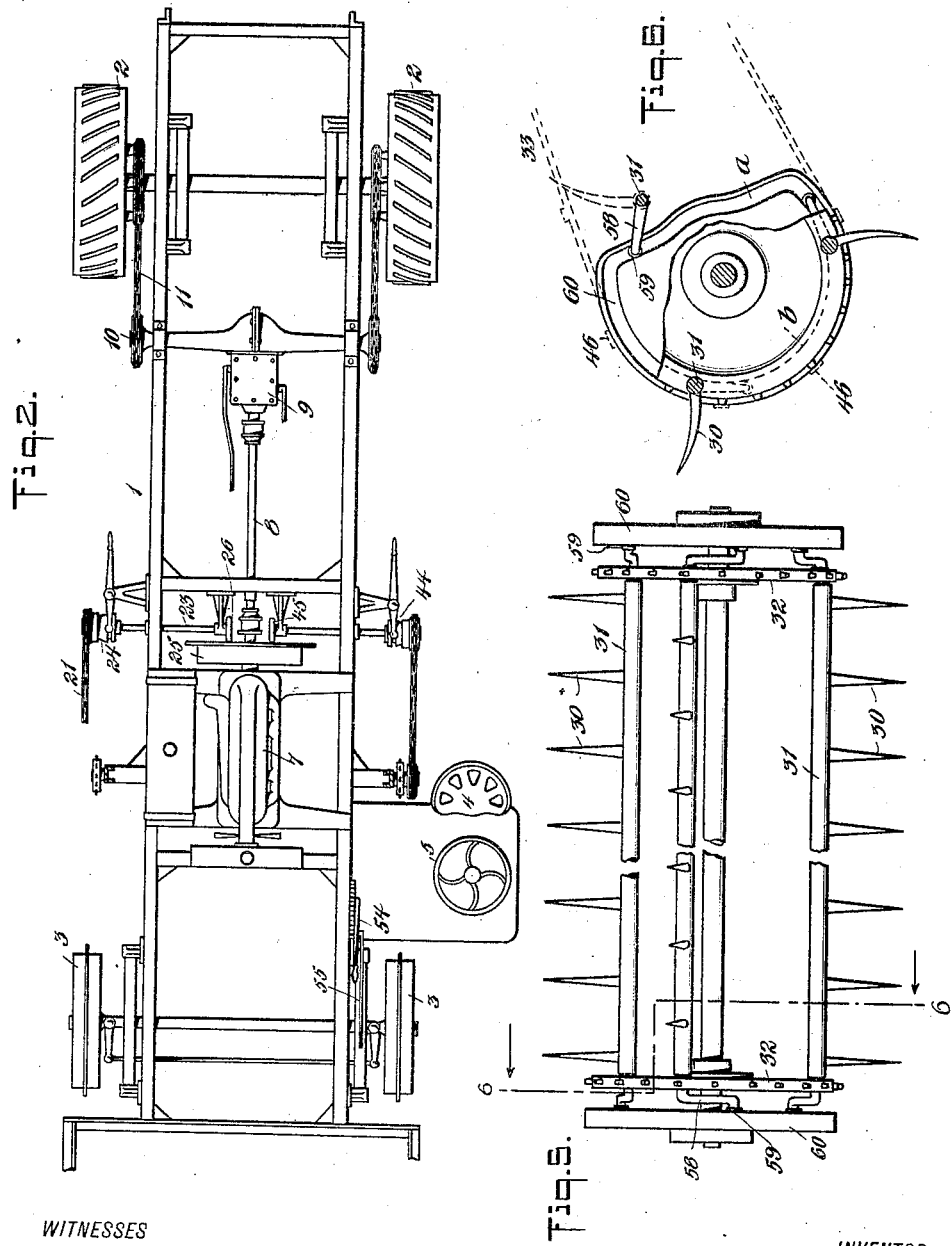

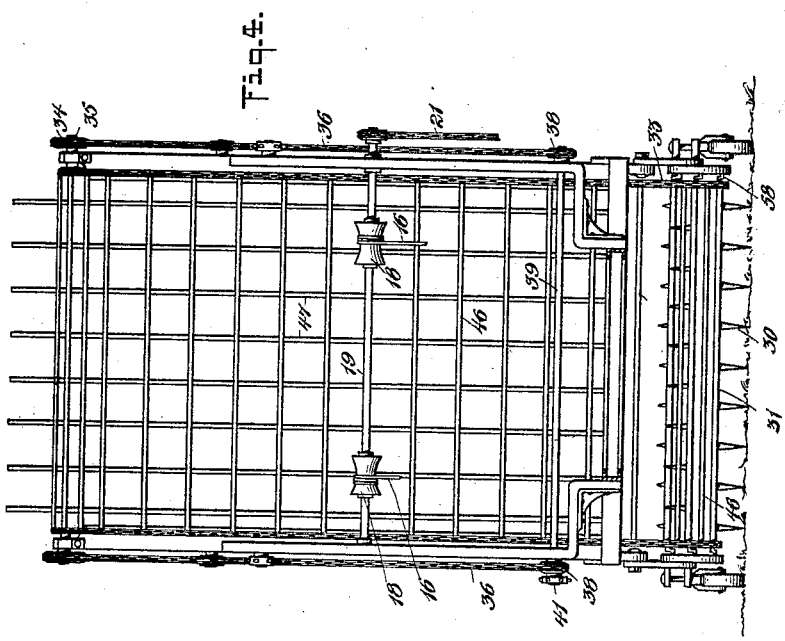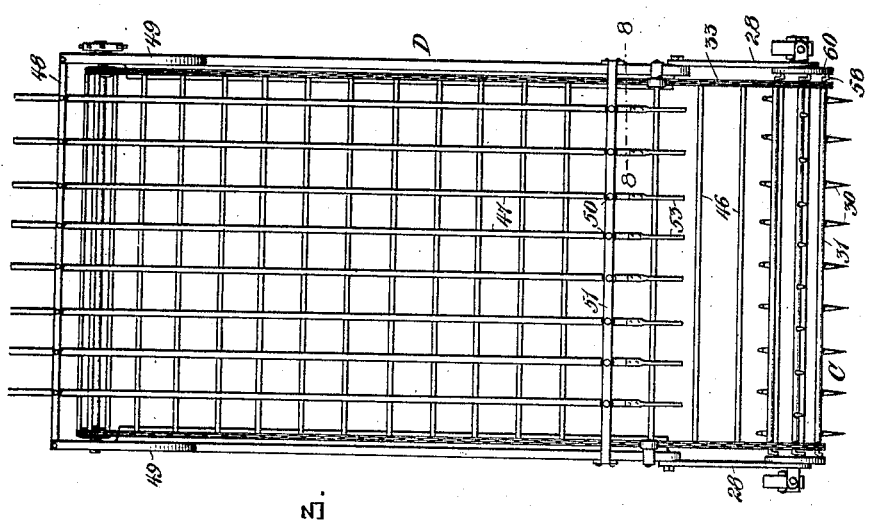

JULIUS J. KROGEN, OF BOTTINEAU, NORTH DAKOTA.

SHOCK-LOADER.

1,306,597.

Specification of Letters Patent.   Patented June 10, 1919.

Application filed March 27, 1918.   Serial No. 224,971.

*To all whom it may concern:*

Be it known that I, JULIUS J. KROGEN, a citizen of the United States, and a resident of Bottineau, in the county of Bottineau and State of North Dakota, have invented a new and Improved Shock-Loader, of which the following is a full, clear, and exact description.

This invention relates to a shock loading and carrying machine for the purpose of picking up the sheaves of a shock and loading them into the basket or body of the machine, so that when the body is filled, the machine is driven to the threshing machine and there unloaded, where the sheaves are pitched by men to the feeder of the threshing machine.

The invention has for its general objects to provide a self-propelled machine of the character referred to which is reliable and efficient in use, quick in operation and capable of carrying a large load of sheaves.

A more specific object of the invention is the provision of a self-propelled vehicle having simple, novel and effective means for picking up sheaves and elevating them to a point where they can drop into the basket or body of the machine, and additional means for automatically dumping the load by tilting the body or basket, both of said means being capable of connection with the propelling engine of the vehicle at the will of the driver.

With such and other objects in view, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a side view of the machine shown in the operation of loading;

Fig. 2 is a plan view of the chassis of the machine;

Fig. 3 is a view of the front of the machine taken at right-angles to the plane of the elevator;

Fig. 4 is a vertical section on the line 4—4, Fig. 1;

Fig. 5 is a front view of the rotatable sheave picking-up device;

Fig. 6 is a transverse section on the line 6—6, Fig. 5;

Fig. 7 is a front view of the load-carrying basket or body; and

Fig. 8 is a detail sectional view on the line 8—8, Fig. 3.

Referring to the drawing, A designates the chassis, B the basket or body, C the pick-up device and D the elevating conveyer.

The chassis includes a frame 1 supported on rear driving wheels 2 and front turning wheels 3, which latter are controlled from the driver's seat 4 by a steering wheel 5 which is connected with the front wheel by a steering mechanism 6. On the frame 1 is an engine 7 which not only propels the machine but supplies all the power for the necessary operation of the various power-driven parts. This engine is connected by a propeller shaft 8, change speed gear 9, a secondary shaft 10 and sprocket chain drive 11 with the rear wheels 2.

The body or basket B is a light openwork structure of suitable strength, open at its top and rear end, so that the sheaves can be dropped into the basket from the top and discharged from the rear end. The basket is hingedly connected at 12 to the rear end of the frame 1, as clearly shown in Fig. 1, and the front end of the basket is adapted to be raised so that the contents can be dumped out through the rear. The rear end of the basket is normally closed by a gate or door 13, which swings from an overhead axis 14, there being a catch device 15 to hold the gate closed. When the catch device is released and the basket or body is tilted, the gate will gravitate to open position, so as to allow the contents of the basket to be discharged on the ground close to the threshing machine. The body B is tilted by a pair of cables 16, Figs. 1 and 4, which are connected at 17 to the lower front part of the body and extend upwardly and pass around winding drums 18 on a horizontal shaft 19 journaled in an upright secondary frame 20 on the main frame 1. As shown in Fig. 4 the shaft 19 is driven by a sprocket chain 21, which is driven from a secondary shaft 23 through a manually operated clutch 24, Fig. 2, the secondary shaft 23 being driven from the flywheel 25 through a friction disk 26 bearing against the flywheel. When the load is to be dumped the engine 7 furnishes the power, it being merely necessary for the operator to close the clutch 24, whereby the power will be taken from the flywheel and transmitted to the winding drums 18, whereby the cables 16 will be wound on the drums to elevate the front of the body or basket B. After the load is dumped the body is allowed to assume its normal position by disconnecting the engine from the winding drums, through the friction clutch 24.

At the front of the machine is an inclined frame 27 at the bottom of which is a swinging arm 28 hinged to the frame at 29. This arm carries the pick-up device C, which includes a rotary structure having a plurality of sets of teeth 30, each set being mounted on a rock shaft 31 journaled in sprocket or driving wheels 32. These sprocket wheels 32 mesh with sprocket chains 33 which pass upwardly along the frame 27 and run over sprocket wheels 34 on a shaft 35 at the top of the frame 27. This shaft 35 is driven by sprocket chains 36 which run over sprocket wheels 37 on the engine shaft 35, and over sprocket wheels 38 on the ends of a horizontal shaft 39 at the bottom of the frame 20. This latter shaft 39 is driven by a sprocket chain 40 which meshes with a sprocket wheel 41 on the shaft 39 and with a sprocket wheel 42 on a countershaft 43, corresponding to the countershaft 23. A manually - controlled clutch 44 connects the sprocket wheel 42 with the shaft 43, which latter has a friction disk 45 meshing with the flywheel. As long as the clutch 44 is closed, the engine will drive the toothed pick-up element at the front of the arm 28 and will also operate the means for elevating the sheaves through the device D. This means includes a plurality of slats 46 which are parallel with each other and connected with the sprocket chains 33, whereby an endless conveyer is formed, on the upper flight of which the sheaves are carried. Over this endless conveyer are a plurality of keeper bars 47 which are parallel with each other and extend in the direction of travel of the sheaves, the said bars being fastened to a floating cross bar 48 at the top, which latter is mounted on the inclined frame 27 by bowed springs 49, whereby the series of keeper bars are yielding toward and from the endless conveyer. The lower ends of the keeper bars 47 are yieldingly supported by means of hanger rods 50 which are free to move upwardly through a supporting cross bar 51, there being springs 52 on the hanger rods for yieldingly urging the keeper bars 47 downwardly. On the lower end of each keeper bar is a deflector 53 which assists in guiding the sheave under the keeper bars so that the latter will frictionally hold the sheaves in engagement with the slats of the endless conveyer.

In transporting the machine from place to place when the loading mechanism is not in use, the pick-up arm 28 is adapted to be raised a suitable distance above the road or surface over which the machine is traveling. For this purpose an elevating lever 54 is mounted on the machine at a point adjacent the driver, and this lever is connected by a rod or equivalent element 55 with a swinging arm 56 on the frame 27, the arm 56 being in turn connected by a rod 57 with the arm 28. In order that the teeth 30 may be freed from the sheaves the teeth are drawn downwardly simultaneously with their orbital movement by reason of the fact that on each rock shaft 31 are crank arms 58, Fig. 6, which have rollers 59 which run in stationary cam grooves 60. While the series of teeth pass along the approximately straight portion $a$ of the cam groove, the teeth are retracted, and as soon as the concentric portion $b$ of the cam groove is reached by the rollers 59, the teeth are thrown out at an approximately radial position to pick up the sheaves. When the teeth are retracted from the sheaves the latter rest on the conveyer slats and are carried upwardly through the elevating mechanism D and discharged into the basket B.

From the foregoing description taken in connection with the accompanying drawings, the advantages of the construction and method of operation will be readily understood by those skilled in the art to which the invention appertains, and while I have described the principle of operation, together with the machine which I now consider to be the best embodiment thereof, I desire to have it understood that the machine shown is merely illustrative and that such changes may be made when desired as fall within the scope of the appended claims.

Having thus described my invention, I claim as new and desire to secure by Letters Patent:

1. A machine of the class described, comprising a wheel supported frame, power means for propelling the frame, a body hinged to the rear of the frame to tilt, means for tilting the body from the power means, an inclined elevator having a hinged lower section and discharging into the body, a plurality of sets of teeth mounted in the outer end of the hinged elevator section between the sides of the elevator and adapted to be projected and retracted, and means for operating the elevator and teeth from the power means.

2. In a machine of the character described, a vehicle having a body, an inclined frame on the vehicle and extending above and partly over the body, arms hinged to the lower end of the frame, sprocket wheels mounted in the upper end of the inclined frame and the forward ends of the said arms, sprocket chains passing around the said sprocket wheels and provided with slats connecting the chains, a plurality of shafts mounted in the sprocket wheels of said arms and having teeth and crank arms at their ends, stationary cams carried by the hinged arms and with which the cranks of the said shafts engage, and means for operating the shaft of the sprocket wheels at the upper end of the inclined frame.

JULIUS J. KROGEN.

Copies of this patent may be obtained for five cents each, by addressing the "Commissioner of Patents, Washington, D. C."